United States Patent
Andujar

(10) Patent No.: US 8,319,366 B2
(45) Date of Patent: Nov. 27, 2012

(54) SYSTEM FOR CONVERTING TIDAL WAVE ENERGY INTO ELECTRIC ENERGY

(76) Inventor: Juan Andujar, San Juan, PR (US)

( * ) Notice: Subject to any disclaimer, the term of this patent is extended or adjusted under 35 U.S.C. 154(b) by 460 days.

(21) Appl. No.: 12/634,879

(22) Filed: Dec. 10, 2009

(65) Prior Publication Data

US 2010/0140945 A1    Jun. 10, 2010

Related U.S. Application Data

(60) Provisional application No. 61/121,251, filed on Dec. 10, 2008, provisional application No. 61/121,247, filed on Dec. 10, 2008.

(51) Int. Cl.
  *F03B 13/12* (2006.01)
(52) U.S. Cl. .......................................................... 290/53
(58) Field of Classification Search ...................... 290/53
  See application file for complete search history.

(56) References Cited

U.S. PATENT DOCUMENTS

| | | | | |
|---|---|---|---|---|
| 1,061,091 | A * | 5/1913 | Lewis | 60/506 |
| 1,074,060 | A * | 9/1913 | Melander | 417/332 |
| 2,278,818 | A * | 4/1942 | Zoppa | 417/330 |
| 3,151,564 | A * | 10/1964 | Rosenberg | 60/499 |
| 3,214,916 | A | 11/1965 | Martin | |
| 4,580,400 | A * | 4/1986 | Watabe et al. | 60/398 |
| 6,020,653 | A | 2/2000 | Woodbridge et al. | |
| 6,184,590 | B1 | 2/2001 | Lopez | |
| 6,791,205 | B2 | 9/2004 | Woodbridge | |
| 6,936,937 | B2 | 8/2005 | Tu et al. | |
| 7,023,104 | B2 * | 4/2006 | Kobashikawa et al. | 290/42 |
| 7,164,212 | B2 | 1/2007 | Leijon et al. | |
| 7,199,481 | B2 | 4/2007 | Hirsch | |
| 7,242,106 | B2 | 7/2007 | Kelly | |
| 7,298,054 | B2 | 11/2007 | Hirsch | |
| 7,323,790 | B2 | 1/2008 | Taylor et al. | |
| 7,834,474 | B2 * | 11/2010 | Whittaker et al. | 290/53 |
| 8,110,937 | B2 * | 2/2012 | Finnigan | 290/53 |
| 2005/0271470 | A1 | 12/2005 | Rytand | |
| 2011/0084489 | A1 * | 4/2011 | Kaplan | 290/54 |

FOREIGN PATENT DOCUMENTS

WO  WO 2009069168 A2 *  6/2009
WO  WO 2011079199 A1 *  6/2011

* cited by examiner

*Primary Examiner* — Joseph Waks
(74) *Attorney, Agent, or Firm* — James Ray & Assoc.

(57) ABSTRACT

A system for converting marine surface wave energy into electric energy includes a barrier disposed generally vertically and having at least a portion thereof disposed above a surface of a body of water. The portion has a substantially planar surface disposed generally transverse to direction of marine surface waves. Bottom edge of the barrier is pivotally connected to one of a floor bed, a rigid formation and a rigid structure. At least one linear electric generator is coupled to storage of electric energy and is operable by a pivotal movement of the barrier. One type of electric generator is disposed external to the barrier while another type is mounted within a barrier chamber.

15 Claims, 15 Drawing Sheets

SYSTEM FOR CONVERTING TIDAL WAVE ENERGY INTO ELECTRIC ENERGY

CROSS-REFERENCE TO RELATED APPLICATIONS

This application is related to and claims priority from Provisional Patent Application Ser. No. 61/121,247 filed on Dec. 10, 2008 and from Provisional Patent Application Ser. No. 61/121,251 filed on Dec. 10, 2008.

FIELD OF THE INVENTION

The present invention relates, in general, to wave energy conversion systems and, more particularly, this invention relates to a system for converting tidal wave energy into electric energy and, yet more particularly, the instant invention is related to a system for converting tidal wave energy into electric energy that employs a rigid barrier submerged in a body of water and pivotally mounted to a floor bed and electric generators operable by barrier's pivotal movement caused by tidal waves.

BACKGROUND OF THE INVENTION

As is generally well known, carbon emissions from burning fossil fuels and reliance on foreign fuel sources are becoming increasing concerns for humanity. Many present devices and systems employed to produce electricity emit fumes and chemicals which pose hazards to the ozone layer of the earth. Furthermore, rising energy costs have affected not only businesses, but homeowners as well. Thus, there has been a proliferation of alternative approaches to generate electric energy.

One of such approaches is based on extracting energy from tidal waves and converting it into electric energy. Generally, prior art wave energy conversion systems employ a buoyant member floating upon a water surface and coupled to a proximal end of a linear electric generator positioned in a generally vertical plane and having its distal end coupled to the floor bed. U.S. Pat. Nos. 7,298,054 and 7,199,481 both issued to Hirsch, U.S. Pat. No. 7,242,106 issued to Kelly, U.S. Pat. No. 6,791,205 issued to Woodbridge, U.S. Pat. No. 6,020,653 issued to Woodbridge et al., and U.S. Pat. Pub. No. 2005/0271470 to Rytand disclose various types of such systems employing buoyant member.

U.S. Pat. No. 6,184,590 issued to Lopez discloses a wave-actuated electricity generating device that includes a base and a gate having bottom edge thereof pivotally coupled to the base. The gate pivots in first and second directions with the movement of the waves. A pushrod has proximal and distal ends and a longitudinal axis extending therebetween. The proximal end of the pushrod is pivotally coupled to the gate. The distal end of the pushrod is adapted for coupling to an electric power generator of a flywheel type.

However, while these prior art systems fulfill their respective requirements, there is a need for further improvements in converting tidal wave energy into electric energy.

SUMMARY OF THE INVENTION

The invention provides a system for converting marine surface wave energy into electric energy. The system includes a barrier disposed generally vertically and having at least a portion thereof disposed above a surface of the body of water. The portion has a substantially planar surface disposed substantially transverse to direction of marine surface waves. There is a predetermined plurality of spaced apart pylons at least partially disposed in a vertical direction within the floor bed and aligned in a first linear pattern substantially transverse to direction of marine surface waves. There is also a predetermined plurality of elongated members. Each of the predetermined plurality of elongated members has each of a hollow interior and one end thereof disposed on and secured to the bottom edge of the barrier. A hinge assembly pivotally connects an opposed end of the each of the predetermined plurality of elongated members to an exposed end of a respective one of the predetermined plurality of first pylons. A predetermined plurality of elongated chambers disposed within the barrier. Each of the predetermined plurality of elongated chambers having a longitudinal axis thereof aligned in a vertical direction. There is a predetermined plurality of first electric generators. Each of the predetermined plurality of first electric generators is mounted within a respective elongated chamber and is coupled to storage of electric energy. Each of the predetermined plurality of first electric generators has a stator mounted for a rotational movement. There is also means for imparting the rotational movement of the stator. A predetermined plurality of first air passages formed through a top end of a respective one of the predetermined plurality of first electric generators. A predetermined plurality of second air passages formed through a bottom end of the respective one of the predetermined plurality of first electric generators. There is a source of pressurized air supply having at least an air pump and an air manifold connecting an output of the air pump with each of the predetermined plurality of first air passages. At least one column is provided and has a bottom end thereof imbedded in the floor bed and has an opposed second end thereof positioned above the surface of the body of water. A base member is secured in a substantially horizontal plane to the at least one column. A predetermined plurality of second electric generators supported above the surface of the body of water in the substantially horizontal plane on at least one of the at least one column and the base member. Each of the predetermined plurality of second electric generators disposed and coupled to the storage of electric energy. There is means for pivotally connecting a distal end of a movable portion of each of the predetermined plurality of second electric generators to an inner surface of the barrier. At least one stop is mounted on a selected one of the predetermined plurality of columns. At least one powered attenuator is provided and has a stationary member thereof supported above the surface of the body of water in the substantially horizontal plane on the at least one of the at least one column and the base member and having a movable member thereof reciprocally movable in the substantially horizontal plane in a linear direction generally transverse to the inner surface of the barrier. There is means for pivotally connecting a distal end of the movable member of the at least one attenuator to the inner surface of the barrier. There is also a control means for controlling movement of the movable member of the at least one attenuator.

OBJECTS OF THE INVENTION

It is, therefore, one of the primary objects of the present invention to provide a system for converting tidal wave energy into electric energy.

Another object of the present invention is to provide a system for converting tidal wave energy into electric energy that employs a rigid barrier submerged in a body of water and pivotally mounted to a floor bed and a predetermined plurality of electric generators operable by barrier's pivotal movement caused by tidal waves.

Yet another object of the present invention is to provide a system for converting tidal wave energy into electric energy that employs a rigid barrier submerged in a body of water and pivotally mounted to a floor bed, a predetermined plurality of electric generators operable by barrier's pivotal movement caused by tidal waves and hydraulic attenuators capable of each of cushioning barrier's pivotal movement in one direction and enacting barrier's movement in an opposed direction.

A further object of the present invention is to provide a system for converting tidal wave energy into electric energy that employs a rigid barrier submerged in a body of water and pivotally mounted to a floor bed and stops for limiting barrier's pivotal movement in one direction.

Yet a further object of the present invention is to provide a system for converting tidal wave energy into electric energy that employs a rigid barrier submerged in a body of water and a predetermined plurality of electric generators, each mounted within a chamber provided within the barrier and operable by barrier's pivotal movement caused by tidal waves.

An additional object of the present invention is to provide a linear electric generator capable of generating electric energy.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
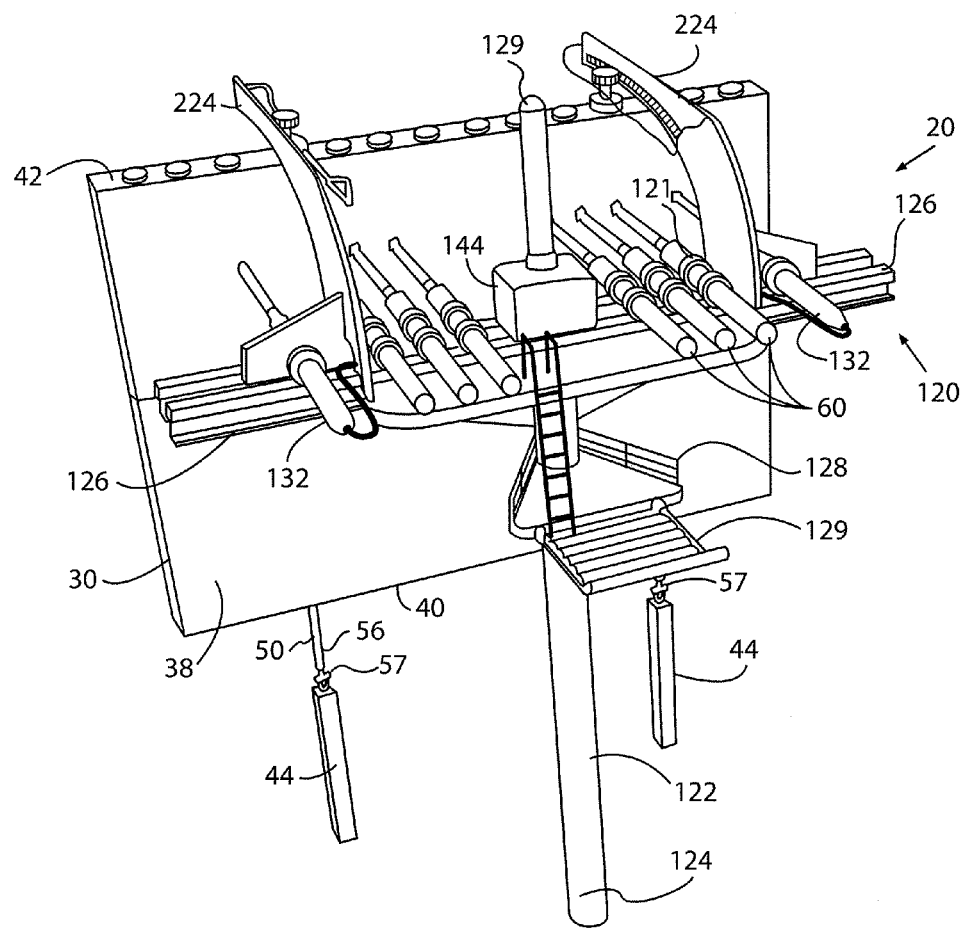
FIG. 1 illustrates a rear isometric view of a system of the present invention for converting tidal wave energy into electric energy.

Prior to proceeding to the more detailed description of the present invention, it should be noted that, for the sake of clarity and understanding, identical components which have identical functions have been identified with identical reference numerals throughout the several views illustrated in the drawing figures.

Now in reference to FIGS. 1-18, therein is provided a system, generally designated as 20, for converting energy of tidal waves 5 into electric energy. Such tidal waves 5, as is generally known, are present on a surface 4 of a large body of water 2. The surface 4 is generally meant to be defined as a mean low waterline.

A first essential element of the system 20 is a barrier 30 which is disposed generally vertically and has each of a lower portion 32 thereof submerged in a body of water 2 and an upper portion 34 thereof disposed above the surface 4 of the body of water 2. However, it is contemplated that the entire barrier 30 may be positioned above the surface 4 of the body of water 2. The barrier 30 defines a substantially planar outer surface 36 facing outwardly and disposed substantially transverse to direction of tidal waves 5 and an opposed inner surface 38 facing the shoreline 6.

Preferably, the upper portion 34 has a height between five (5) feet and ten (10) feet. The overall size of each barrier 30 depends on the water depth from the surface 4 to the floor bed 8, tidal wave conditions, ocean type shoreline and/or beach geological conditions and marine ecological conditions.

It has been found that the barrier 30 manufactured from a massively strong and durable pre-stressed pre-cast concrete is sufficient for use in most applications. However, the instant invention contemplates that other materials, for example such as fiberglass, any engineered polymers including carbon composites, polyethylene, polypropylene, and acetyl polymers, and/or marine grade aluminum can be employed, in a novel manner, for manufacturing the barrier 30 of the present invention. In the applications with a lower tidal wave inertia generation, a tremendous mass of concrete may reduce the conversion efficiency of the kinetic energy of the tidal wave 5 into electric energy generation, thus fiberglass, engineered polymers and/or marine grade aluminum offers improved performance in such applications with a lower tidal wave inertia generation as well as offers weight reduced construction in all applications.

Barrier 30, when manufactured from fiberglass, engineered polymers and/or marine grade aluminum, may be adapted with internal vertical and horizontal reinforcement ribs creating an endoskeleton (not shown) of exceptional strength with multidimensional flexibility so as to withstand constant series of changing forces both in terms of angular longitudinal impacts as the prevailing wind angle changes and the wave heights and angle of vertical forces changes with varying wind velocities and fetch conditions. Since the tidal waves 5 strike at less than ideal ninety (90) degree angles, the barrier 30 is designed to withstand sudden rogue waves 5, generally defined as maximum through to crest wave heights greater than two times of the nominal wave height.

Shipping and installation of the barrier 30 manufactured from fiberglass, engineered polymers and/or marine grade aluminum should greatly reduce weight and shipping requirements and simplify assembly and installation effort. A fiberglass panel concept can be reduced to a series of pieces that can be shipped and handled without massive lifting cranes. The panel sections can then be joined via internal stainless bolts on shore, at the site of deployment. The external joints (not shown) between the panels can then be "finished" with a top coat of fiberglass cloth and resin included as a complete "kit" with each panel. This arrangement may also provide for substantially reduced maintenance cost in case of damages as well as substantially reduced personnel labor and insurance costs.

The use of fiberglass, engineered polymers and/or marine grade aluminum may allow ease of periodic access to the internal joining rib panels and internal mechanisms for service and/or replacement as opposed to their being permanently imbedded in a heavy concrete panel.

Since fiberglass, engineered polymers and/or aluminum materials are commonly used in the boat construction, damages to the barrier 30 due to drifting logs, boat impacts or storm damage can be easily repaired.

For the reasons to be explained later, the use of fiberglass, engineered polymers and/or marine grade aluminum may allow ease of assembly by way of molded interior cylinder into which the internal components can be slid into place and then a water proof, threaded cap be used to seal in the components.

However, the aforementioned benefits of the above described fiberglass, engineered polymers and/or marine grade aluminum must be viewed carefully due to potentially higher material costs as compared with the barrier 30 manufactured from concrete.

Figure 7:
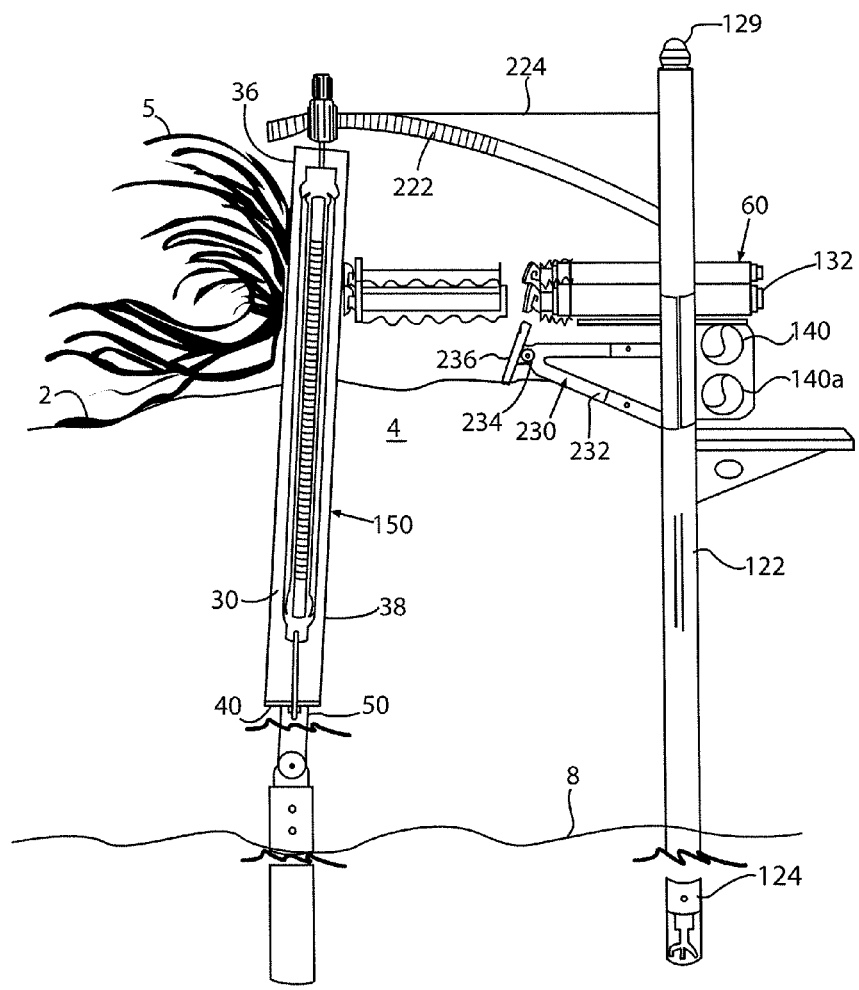
FIG. 7 is a side elevation view of the system of FIG. 1, particularly illustrating barrier 30 in its normal position for receiving impact energy from tidal waves.
Figure 8:
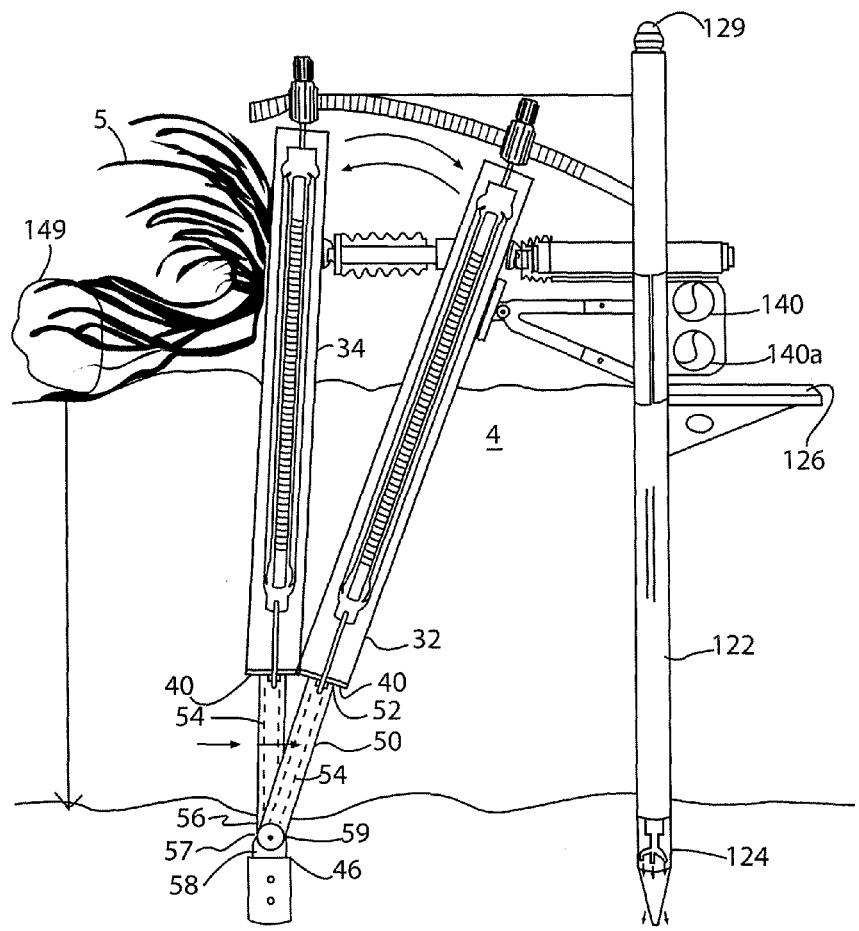
FIG. 8 is a side elevation view of the system of FIG. 1, particularly illustrating motion of the barrier 30 from its normal position upon receiving impact energy from tidal waves.

Now in a particular reference to FIGS. 1, and 7-8, there is also means for pivotally connecting a bottom edge 40 (or generally a bottom end) of the barrier 30 to at least one of the floor bed 8, rigid natural formation, for example such as a cliff or rock formation (not shown), and a rigid structure, for example such as an oil extracting platform rig (not shown). The present invention is illustrated and described in combination with a near shore installed system 20 having a floor bed mounted barrier 30, although it will be apparent to those skilled in the relevant art that the present invention may be applied to above-referenced rigid structures and formations and as such should not be interpreted as a limiting factor of the system 20 of the present invention.

Such means for pivotally connecting the bottom edge 40 includes at least one and, preferably, at least a pair of spaced apart first pylons 44 at least partially disposed within the floor bed 8 and aligned in a first linear pattern. Each first pylon 44 may be manufactured from a recycled composite steel plastic and range in size from about a four (4) inch diameter pipe to a twelve (12) inch diameter pipe or "H" beam depending on the type of ocean inertia to be attenuated. Each first pylon 44 is associated with an elongated member 50 having one end 52 thereof disposed on and secured to the bottom edge 40 of the barrier 30. The elongated member 50 may have a hollow interior 54. A hinge assembly 57 pivotally connects an opposed end 56 of the each elongated member 50 to an upper end 46 of a respective one of the at least pair of first pylons 44. The hinge assembly 57 is preferably of a clevis type system including a U-shaped bracket 58 and pin 59 and further employing sealed marine grade bearings (not shown).

The system 20 also includes at least one and, preferably, a predetermined plurality of linear type electric generators. In accordance with one embodiment of the invention, the linear electric generators, generally designated as 60, are mounted in a substantially horizontal plane in operable connection, by way of main electrical conduit 11, to a storage of electric energy, such as a collecting station 10, and are operable by the pivotal movement of the barrier 30 in the rearward direction toward the shoreline 6 with such pivotal movement caused by energy of the tidal wave 5.

Figure 3:
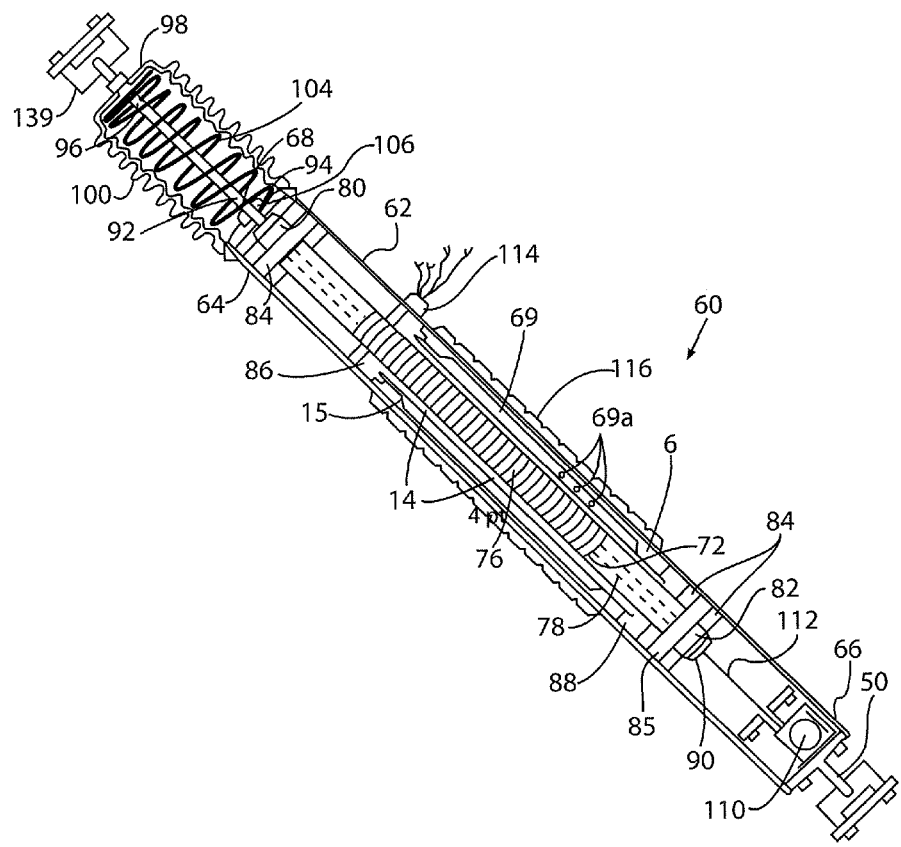
FIG. 3 illustrates a cut-away view of a linear electric generator employed within the system of FIG. 1, shown in an extended position, and which is constructed in accordance with one embodiment of the invention.
Figure 4:
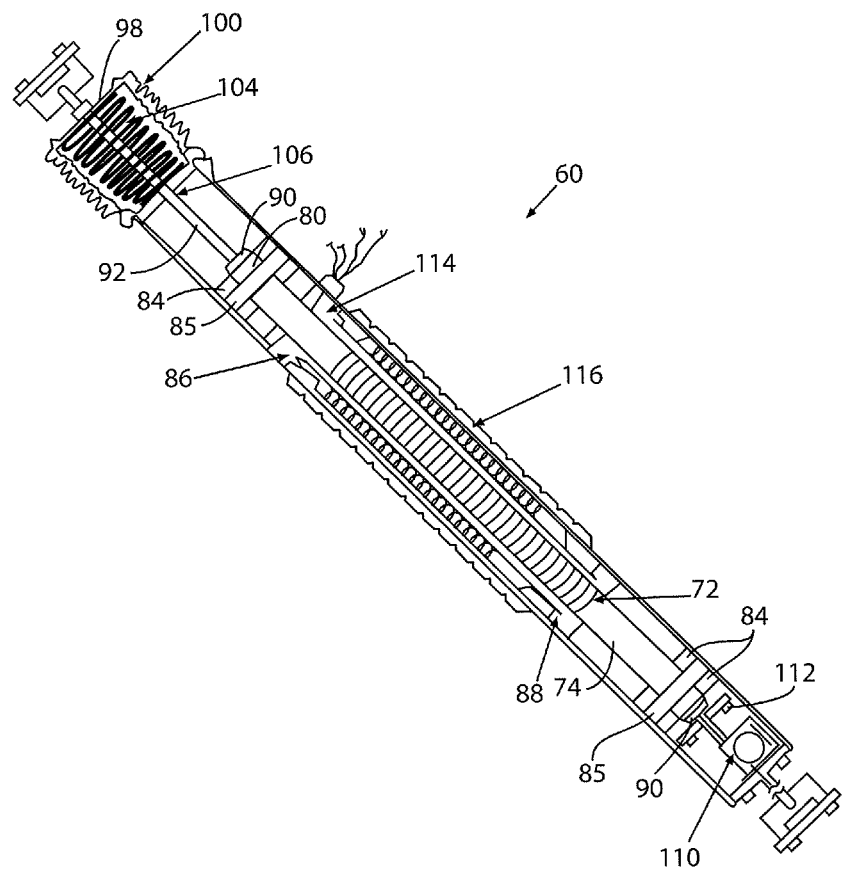
FIG. 4 illustrates a side cut-away view of the linear electric generator of FIG. 3 shown in retracted position.

Now in a particular reference to FIGS. 3-4, each linear electric generator 60 includes a hollow cylindrical housing 62 which is stationary disposed. The housing 62 has a closed front end 64 and a closed rear end 66. The housing 62 is preferably manufactured from a corrosion proof heat transferring material, such as stainless steel or composite polymer. An aperture 68 is formed through the front end 64. An elongated stator 69 is mounted within the hollow housing 62, mediate ends 64, 66 thereof. The stator 69 is defined by at least on stack of high capacity copper wire coil windings 69a disposed in a concentric cylindrical fashion. The number of coil windings depends on the predetermined output of the electric generator 60. When more than one coil stack 69 is provided, such coil stacks may be radially nested within each other.

There is also a reciprocating rotor assembly, generally designated as 72, that includes an elongated shaft 74, manufactured from electrically non-conductive material, and a predetermined plurality of annular permanent magnets 76 that are vulcanized to the outer surface of the elongated shaft 74 mediate ends 80, 82 thereof for movement therewith. The magnets 76 are separated from each other with spacers 77. The outer diameter of annular magnets 76 and spacers 77 and the inner diameter of the coil windings 69a are sized so as to form an air gap 78 which is at least about 0.0984 inches (2.5 mm) and no larger than about 0.1969 inches (5.0 mm). In combination, a bearing 84 and a sliding (centering) block 85 are secured to the elongated shaft 74 at each end 80, 82 thereof for movement therewith.

Each magnet 76 is preferably manufactured from a metallurgical corrosion proof blend of magnetic materials selected from the group comprising of platinum, beryllium, neodymium, gold, antimony, iron, samarium, scandium, magnesium, zirconium, boron, nickel, silver and various homogeneous mixtures thereof. The spacers 77 are preferably manufactured from ferromagnetic and corrosion proof materials selected from a group consisting of iron platinum, nickel, cobalt, niobium, gold, copper and various combinations thereof.

At least one first stationary watertight seal 86, preferably manufactured from a combination of graphite and Teflon® material is mounted on each end 80, 82 adjacent to the bearing 84. A second stationary watertight seal 88, also manufactured from a combination of graphite and Teflon® material, is mounted at each end of the stator stack. Each end 80, 82 of the elongated shaft 74 is also adapted with an elastomeric annular bumper 90 to at least substantially minimize shock loads during operation of the linear electric generator 60.

A drive rod 92 of a self lubricating type is provided and has a proximal end 94 thereof rigidly secured to one end of the elongated shaft 74, referenced with numeral 80 in FIGS. 3-4. The drive rod 92 extends outwardly and axially through the aperture 68. An annular flange or disk 98 is secured to drive rod 92 adjacent to a distal end 96 thereof for movement therewith. A bellows member 100 is also provided and has one end 102 thereof secured in a water tight manner to the closed front end 64 of the housing 62 and has an opposed second end 104 thereof secured in a water tight manner to the annular flange 98. A coiled attenuating compression spring 104 is caged within the bellows member 100 between the closed front end 64 of the housing 62 and the annular flange 98. A third stationary watertight seal 106, also manufactured from a combination of graphite and Teflon®, is preferably mounted at the closed front end 64 of the housing 62. It must be noted that other materials of the first, second and third water seals 86, 88 and 106 respectively, suitable for eliminating entry of the water into the interior space of the housing 72 can be used in the present invention.

An optional constant force stainless steel spring powered cable spool assembly 110 is mounted within the housing 62 adjacent to the bottom end 66 thereof and has a free end of the cable 112 connected to the end 82 of the elongated shaft 74. The cable spool assembly 110 works in tandem with the attenuating spring 104 to aid in the reciprocating movement of the rotor assembly 72 within the housing 62.

A connection, such as an integrally sealed terminal enclosure 114, is provided for communicating electric energy generated by linear reciprocating movement of the rotor assembly 72 within the stator stack of coil windings 69a external to the housing 62. Thus, the coil windings 69a are internally connected to the terminal enclosure 114.

It is also within the scope of the instant invention to coat the outer surface of the housing 62 with a corrosion proof high molecular polyethylene isolator 116.

In operation, the energy from the tidal wave 5 impacting the outer surface 36 of the barrier 30 causes such barrier 30 to pivot at hinge assemblies 57 toward the shore 6 thus enacting linear motion of the elongated shaft 74 in a direction toward the rear end 66 of the housing 62, while overcoming the resistance of the attenuating compression spring 104 being in compression. When the tidal wave 5 subsides and/or recoils from the outer surface 36 of the barrier 30, attenuating compression spring 104 extends forcing the outward linear movement of the elongated shaft 74 and return of the barrier 30 to its normal position. Repetitive impact of the successive tidal wave with the barrier 30 causes reciprocal linear motion of the stator assembly 72 thus generating electric energy during motion thereof.

The design of the linear electric generators 60 is defined by a set of fundamental electromagnetic parameters including the magnet thickness, which determines the air flux resistance density; the electric loading, defined as the resistance winding current per meter of the stator length along the direction of motion; the flux density determined by the pole pitch and the total air-gap, including the magnet polarization resistance. The flux due to the winding current reduces the total and in turn causes the induced voltage to fall. The effect as observed by electrical measurement is the same as a series inductive reactance. This is called the magnetizing polarization resistance reactance and it has a profound influence on the performance of the linear electric generator 60. The electric loading with the flux density affects the shear stress developed at the air-gap and so in turn determines the active surface area required and the overall dimensions and costs of the linear electric generator 60.

The traveled resistance of the rotor assembly 72 relative to the stator assembly 69 is determined by the linear stroke length resistance to coil height resistance and is selected for maximum mass displacement which is determined based on the length height and inertia of the barrier 30.

Tables 1-3 provide design specifications and operational parameters of the near shore installed array system 20 generating about four hundred (400) KW of electric energy at each barrier 30 which is the mean power over the full cycle of the waves 5. The reference design was calculated specifically for a shipping port in the Dominican Republic requiring heavy concrete walls the system 20 employing a concrete barrier 30 having a length of about forty (40) feet, height of about twenty (20) feet wide and thickness of about twenty (20") inches (12 m×6 m×609.6 mm) and eight (8) linear electric generators 60, each having a stroke of about two (2) to three (3) meters (m).

TABLE 1

Design specifications for electric generators 60

| | | |
|---|---|---|
| Tran-stator total length | m | 4 |
| Stator-active-length | (circumference of rotary mc) | 2 |
| Active width | (length of rotary mc, m for double-sided) | 0.41 |
| Air-gap each side | mm | 2.5 |
| Active surface area | Sq. m | 3.3 |
| Magnet thickness | mm | 10 |
| Pole arc/pitch | | 0.4 |
| Pole pitch | mm | 50 |
| End turn length | mm | 100 |
| Length of a mean turn | mm | 1021.5 |
| Slot pitch | mm | 16.65 |
| Tooth width | mm | 8.5 |
| Slot width | mm | 8.15 |
| Slot depth | mm | 24 |
| Back iron depth | mm | 21.55 |
| Slot fill | % | 50% |
| Wire diameter | mm | 1.2 |
| Turns per coil | | 60 |
| Coil per stator | | 90 |
| Parallel coils per phase per stator | | 8 |
| Series of coils per phase per stator (stators in series) | | 5 |

TABLE 2

Operational parameters for electric generators 60

| | | |
|---|---|---|
| Magnet reminisce | T | 1.0 |
| Iron loss factor at 50 Hz, 1.5 | W/Kg | 6 |
| Flux density | T | 0.90 |
| Electric loading | pk ka/m | 45 |
| Mean shear stress | KN/sq. m | 22.4 |
| Maximum armature reaction B | T | 0.11 |
| Winding current density | rmA/sq. mm | 2.8 |
| Maximum frequency | Hz | 6.27 |
| Winding temp | deg C. | 40 |
| Normal force | KN | 1.108 |
| B tooth | T | 1.8 |
| B back | T | 0.8 |

TABLE 3

Steady state performance parameters for linear electric generators 60.

| | | |
|---|---|---|
| Pu mega reactance | | 0.069 |
| Slot leakage reactance | pu | 0.033 |
| Total synchronous reactance | % | 20.4 |
| Coil rms emf | V | 78.5 |
| Coil resistance | Ohm | 1.13 |
| Coil reactance | Ohm | 3.02 |
| Coil inductance | Henry | 0.0765 |
| Phase emf stator | Vrms | 785 |
| Phase resistance | Ohm | 1.415 |
| Phase inductance | Henry | 0.0955 |
| Load resistance per phase | Ohm | 18.45 |
| Line-line output voltage | Vrms | 1359.5 |
| Line current | Arms | 21.25 |
| Peak-output power | W | 100,000 |

TABLE 3-continued

Steady state performance parameters for linear electric generators 60.

| Peak I^2R loss | W | 9703.5 |
|---|---|---|
| Mean output power | W | 50,000 |
| Mean I^2R loss | W | 5,047 |
| Mean iron loss | W | 1,478 |
| Mean eddy current loss | W | 1 |
| Winding temperature | (10 deg am-bent) | 33.6 |
| Mean efficiency | % | 88.8 |

Figure 5:
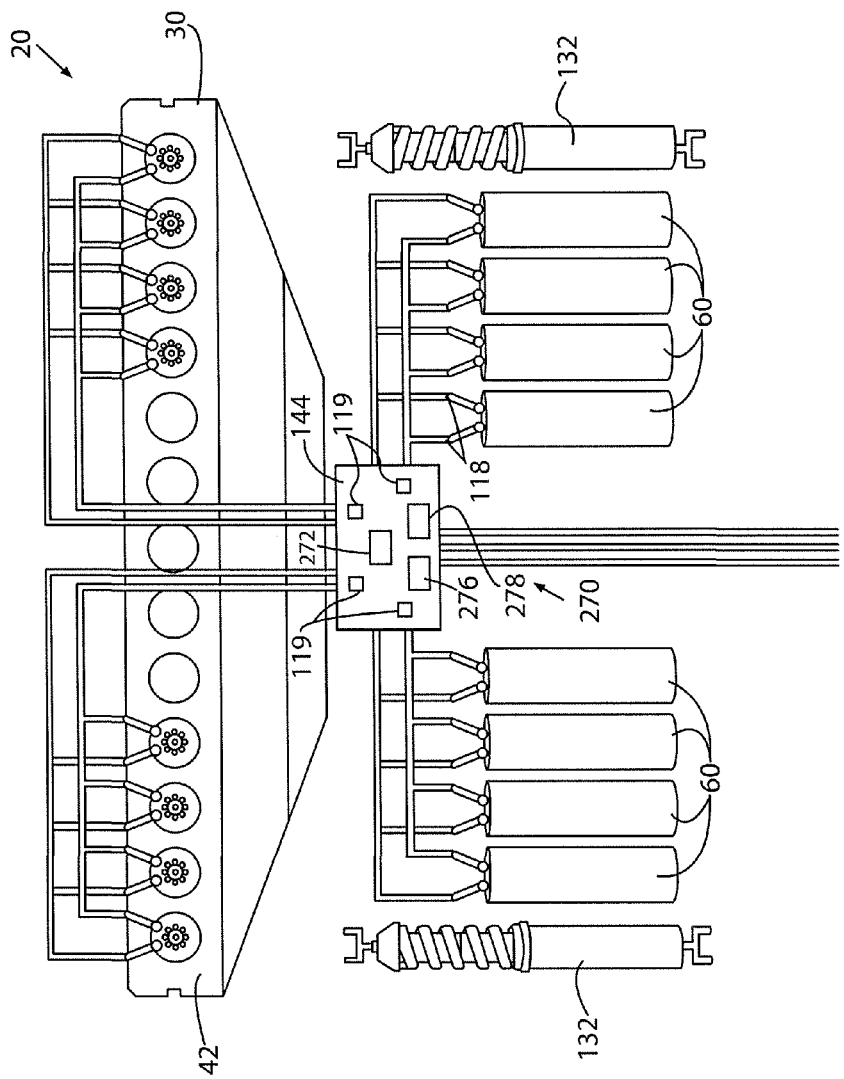
FIG. 5 is a schematic diagram of the system of FIG. 1.

Now, in a particular reference to FIG. 5, each linear electric generator 60 may be connected by a separate cable 118 to a central collecting station 10, particularly when alternative current (AC) power is generated as frequency and voltage from each linear electric generator 60 will differ sufficiently. When direct current (DC) power is generated, output from each linear electric generator 60 may be easily combined into a common cable for cost containment reasons. Thus, at least one and preferably a plurality of rectifiers 119 are provided inside the collecting and converting station 144 to convert the generator AC output to voltage of a DC type. The system 20 shown in FIG. 5 uses a plurality of rectifiers 119 local to each wave power device to convert the generator output to DC at a voltage common to all the devices. A string of devices feeding a common cable is an economical solution. A complete array may have several such strings feeding a single collecting station.

It will be appreciated that extra care is taken to provide a reliable seal to prevent water ingress to the winding space by employing materials of suitable quality and high performance for marine applications. Furthermore, as these seals are stationary, their integrity should be maintained over a period of many years.

In further reference to FIGS. 1-2 and 7-8, the system 20 includes means, generally designated as 120, for securing the at least one linear electric generator 60 in a position to generate electric energy due to reciprocal pivotal movement of the barrier 30. Such means 120 includes at least one elongated column 122, that may be a hollow tube, having a lower end 124 thereof at least partially disposed within the floor bed 8. A base member 126 is secured in a substantially horizontal plane on the at least one elongated column 122 mediate ends thereof. The at least one linear electric generator 60 is then supported by such base member 126 and is secured thereto, for example with marine grade stainless steel quick release clamps 127. For maintenance purposes, a platform 128 and boat ramp 129 may be also attached to the elongated column 122 below the base member 126. Advantageously, a navigation light 129 may be attached to upper end of the elongated column 122.

The system 20 further provides means, generally designated as 130, for attenuating reciprocal pivotal movement of the barrier 30. Such means 130 includes at least one and, preferably, a pair of attenuators 132 disposed in the substantially horizontal plane above the surface 4 of the body of water 2. Each attenuator 132 may be a conventional resilient member, for example such as a coiled spring, but preferably such attenuator 132 is provided as a hydraulic cylinder 132 having a housing 134 attached to the base member 126 and having a piston 137 and a piston rod 136 mounted for linear motion within the housing 134. A distal end 138 of the piston rod 136 is at least engageable in abutting relationship with the inner surface 38 of the barrier 30. Such distal end 138 is preferably attached to the inner surface 38 and is allowed to pivot by way of a pivot 139 in order to accommodate pivotal movement of the barrier 30. The same pivot 139 is preferably employed for connecting the distal end of the drive rod 92 of the linear electric generator 60 to the inner surface 38 of the barrier 30.

Each attenuating hydraulic cylinder 132 is connected to a source of hydraulic fluid pressure, such as a reservoir 140 which may be also mounted on or within the elongated column 122.

Preferably, a pair of attenuators 132 is provided, each disposed at or adjacent to one end of the barrier 30.

Tables 4-5 provide design specifications for attenuating hydraulic cylinder 132 selected based on conservative values for the hydraulic oil pressure of about two hundred (200) Bars and for maximum stresses in the housing walls of about hundred (100) mn/m$^2$.

TABLE 4

Operating parameters for hydraulic cylinder 132.

| Device mean power capability | KW | 50 |
|---|---|---|
| Stroke Length | m | (4) |
| Period | Sec | 2 to 10 |
| Maximum velocity | m/s | 1.311 |
| Peak power | KW | 104 |
| Trust required | KN | 105.1 |

TABLE 5

Design specifications for hydraulic cylinder 132.

| Maximum velocity | m/s | 0.06 |
|---|---|---|
| Stroke | m | 0.16 |
| Maximum force | KN | 1000 |
| Maximum pressure | bar | 100 |
| Annulus area | m^2 | 0.05 |
| Cylinder diameter | m | 0.2185 |
| Cylinder wall stress | MN/m^2 | 90 |
| Cylinder wall thickness | mm | 21.85 |
| Rod diameter | M | 0.126 |
| Fluid flow | L/sec. | 5.0 |
| Fluid flow | L/min. | 300 |
| Working volume | Litre | 8.4 |
| Velocity in pipe | m/s | 2.5 |
| Pipe diameter | mm | 25.25 |
| Pipe wall stress | MN/m^2 | 90 |
| Pipe wall thickness | mm | 5.01 |
| Accumulator fluid volume | Litre | 79.5 |
| Accumulator total volume | m^3 | 0.24 |
| HP accumulator wall stress | MN/m^2 | 90 |
| HP accumulator wall thickness | mm | 17 |
| LP accumulator max. pressure | bar | 2.5 |
| LP accumulator wall thickness | mm | 7 |
| Accumulator diameter | m | 0.34 |
| Cylinder body mass | Kg | 195.5 |
| Piston rod mass | Kg | 125.5 |
| Pipe mass | Kg | 11 |
| HP accumulator mass | Kg | 96 |
| Mass of vegetable oil | Kg | 101 |

Figure 6:
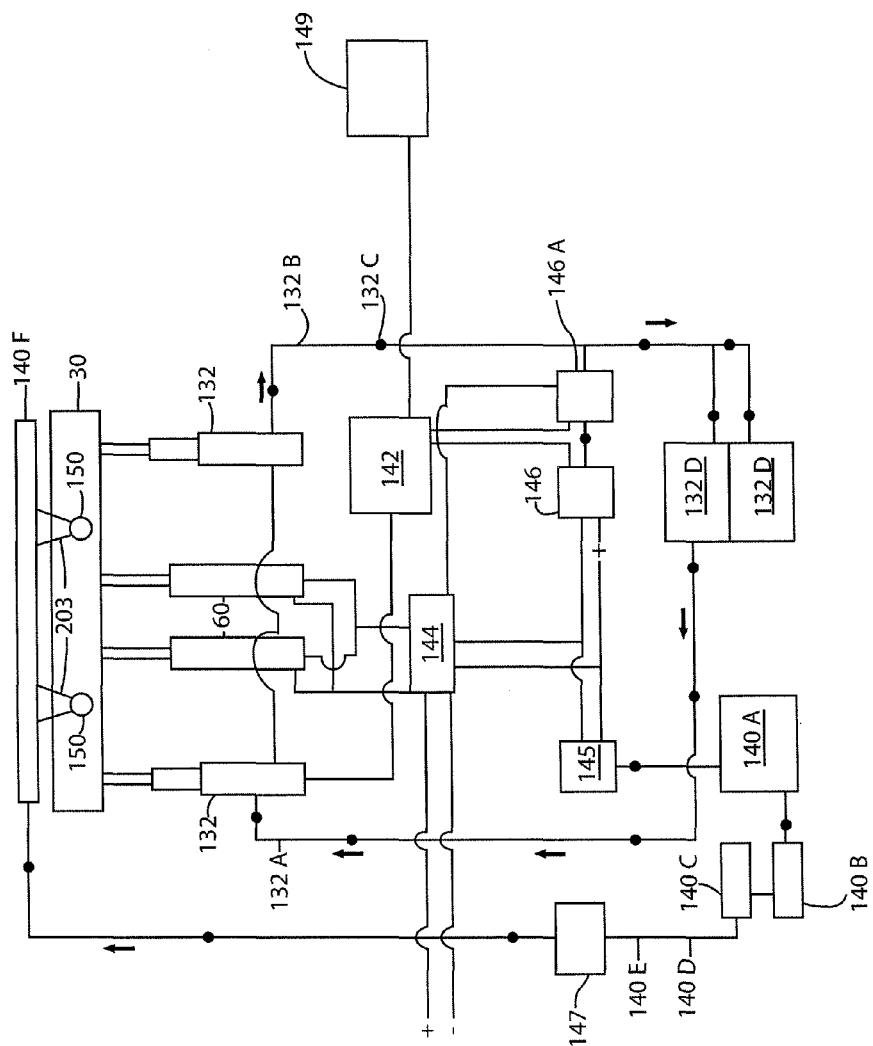
FIG. 6 illustrates a block diagram of a control arrangement for the system of FIG. 1.

Now in a particular reference to FIG. 6, a controller 142, preferably of a microprocessor type, an air compressor, a motor 145 and at least a hydraulic pump motor 146 are provided for controlling flow of the fluid pressure to and from the hydraulic cylinder 132, thus controlling linear movement of the piston rod 136 and, subsequently, controlling pivotal movement of the barrier 30. These components are preferably housed within a robust marine grade stainless steel, high molecular polyethylene coated, climate control equipment enclosure 148 so as to provide both for secure and environmentally protected installation.

An Uninterrupted Power Service (UPS) backup may be provided by a redundant combination of the reservoir 140A and the hydraulic pump motor 146A to keep hydraulic cylinder 132 fully charged and operational throughout the year. The redundant pump motor 146A may be powered from the electric collecting and converting station 144 which would store and use a small amount of the converted electric energy.

Each system 20 may include optional pressurization means formed by the pair of attenuators 132 for increasing the pressure of the hydraulic fluid as a result of the relative movement between the attenuators 132 with hydraulic pressure from an inlet to an outlet of each attenuator 132. Herein, the attenuators 132 are connected by a hydraulic conduit piping 132A arrangement communicating in series between the outlet 132B of each attenuator 132 and the inlet 132A of the associated succeeding unit for conducting fluid through the pair of attenuators 132. A series of check valves 132C are used for conducting the fluid in a single direction therethrough thus providing for incremental increase of the fluid flow and fluid pressure within each valve unit 132C in succession as the hydraulic fluid passes from the inlet of an initial unit at an initial pressure to the outlet of an initial unit at an initial pressure to the outlet of the final unit at a final pressure and stored in the high pressure backup reservoir 132D to prevent intermittence of electric power from the electric generators 60.

A predetermined software algorithm is implemented within the controller 142 to accommodate for the ocean wave conditions adjusting to a full spectrum of wave height, wave energies, uplift, wavelengths, wave directions, and momentum of inertia capability, drag coefficient-fractional change in drag coefficient wave friction, velocity and acceleration due to gravity and wind. To intelligently help match and control the motion of the attenuating hydraulic cylinders 132 to self adjust to the aforementioned sea conditions or can be remotely overridden by land based operator to adjust to sea conditions, enabling each barrier 30 to move reciprocally with a cycle of between about two (2) seconds and about five (5) seconds when waves 5 are small to medium height, thus augmenting generation of electric energy at electric generators 60 in a low tide condition and move reciprocally with a cycle of between about six (6) seconds and about ten (10) seconds when larger waves 5 are present, thus controlling the inertia force of the larger ocean wave 5. In the present invention, such predetermined software algorithm provides for temporarily preventing flow of the hydraulic fluid until a predetermined pressure is created through dynamic pressure caused by barriers 30 in order to accommodate conditions of the wave 5.

Affording the attenuating hydraulic cylinders 132 the ability to stop the swaying motion of the barrier 30, and permanently stay fixed to withstand a storm or hurricane, or permitting, by way of a wave rider buoy 149, best shown in FIG. 8, providing information to software algorithm, simple adjustments of the attenuating hydraulic cylinders 132 to generate reciprocal linear motion, the system 20 is enabled to generate electric energy under substantially all wave conditions. Such wave rider buoy 149 provides the means for measuring the parameters of the tidal wave 5 ahead of the barrier 30 and communicating the measured parameters in a signal form to the controller 142.

The aforementioned tsunami wave rider buoy 149 may be of a type the same used by (NOAA) manufactured by Science Applications International Corp (SAIC). The novel feature of this invention is the ability to match characteristics of the buoy 149 to known power requirements of the system 20. The rider buoy 149 shall be anchored by piling at about two (2) kilometers away from the system 20 and communicate either by a wired connection and preferably wirelessly with inform the microprocessor controller software system 142 as to any change in ocean wave conditions thus assisting in matching the sea conditions with operation of the attenuating hydraulic cylinders 132.

The barrier 30 acts as a point absorber of wave inertia. If such barrier 30 has a natural frequency in resonance with the incoming wave 5 then it has an effective width across the wave-front equal to the wavelength/$2\pi$ i.e. typically three (3) to five (5) meters (m) and would thus interact with waves 5 delivering power in the order of between about two hundred (200) and about four hundred (400) kilowatt (KW). The fifty (50) to one hundred (100) KW rated output is therefore consistent with the anticipated input power to the device.

Figure 9:
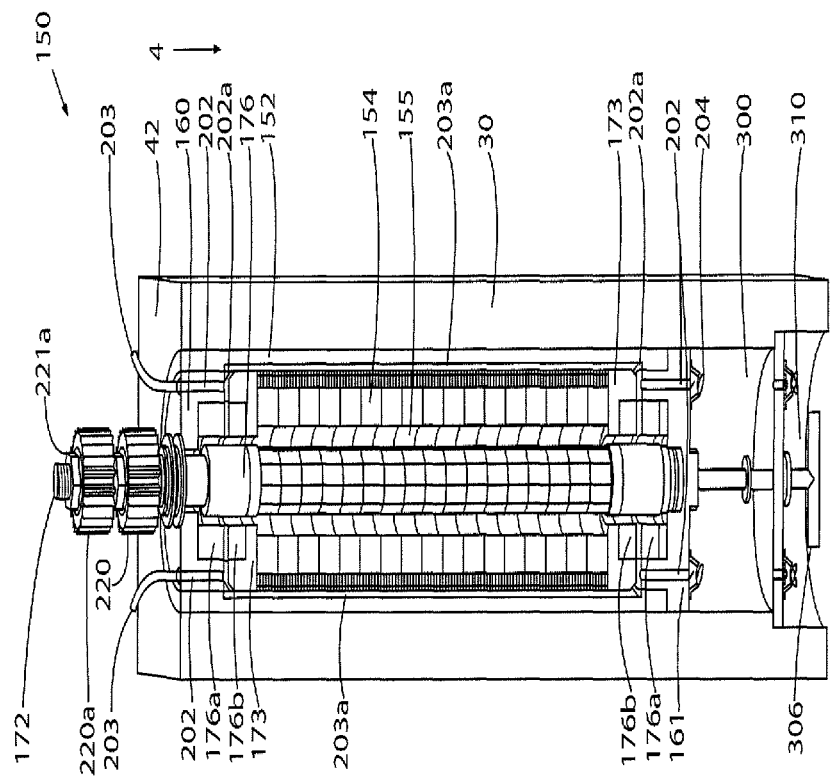
FIG. 9 illustrates a cut-away view of a linear electric generator employed within the system of FIG. 1, and which is constructed in accordance with another embodiment of the invention.
Figure 10:
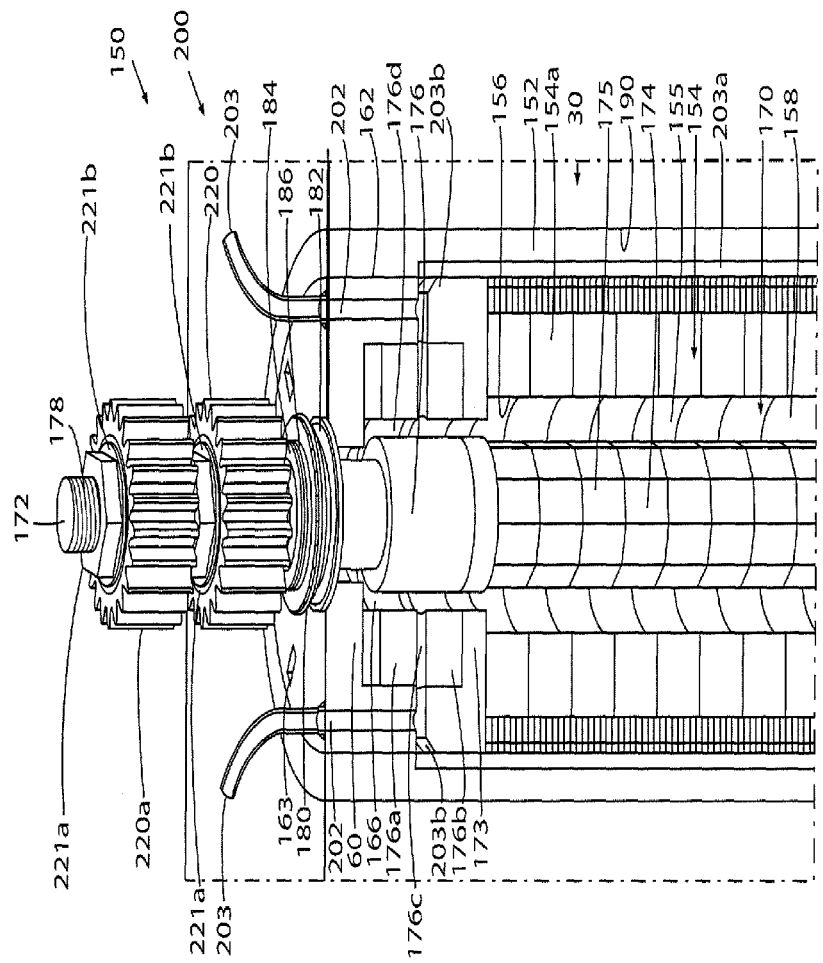
FIG. 10 illustrates an enlarged cut-away view of an upper portion of the linear electric generator of FIG. 9.
Figure 11:
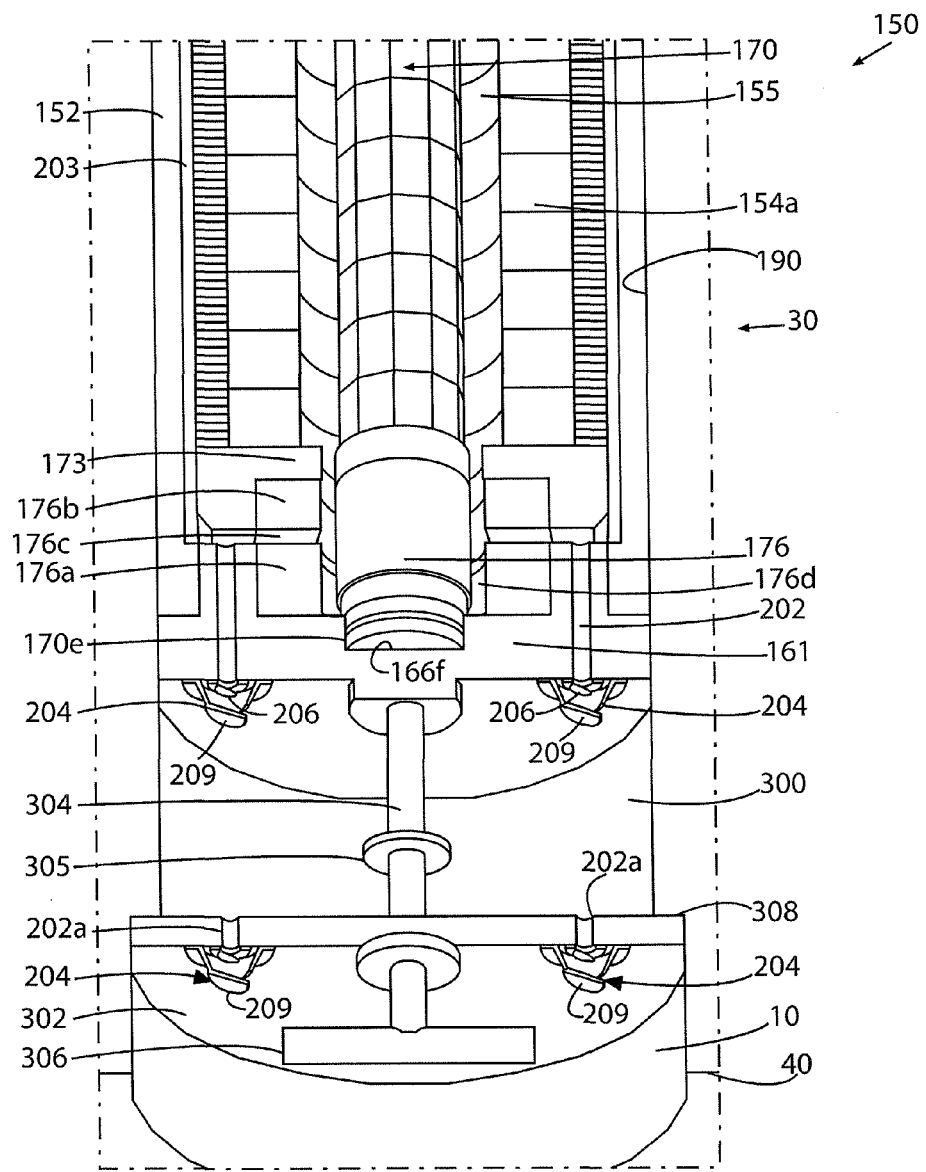
FIG. 11 illustrates an enlarged cut-away view of a lower portion of the linear electric generator of FIG. 9.
Figure 13:
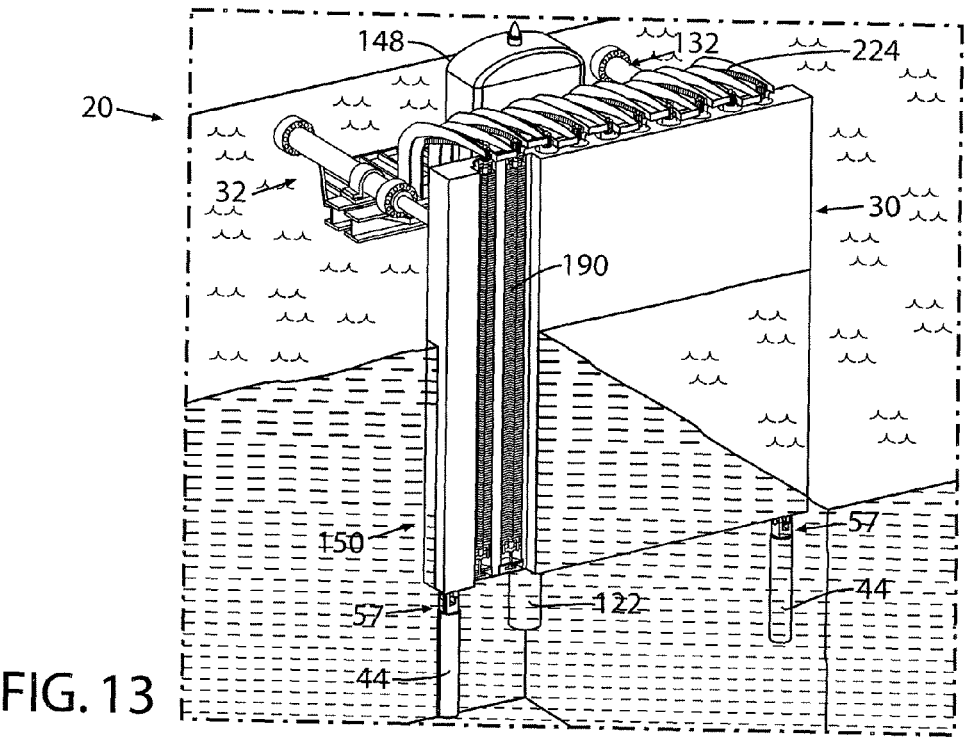
FIG. 13 illustrates one environmental view of employing linear electric generator of FIG. 9.
Figure 12:
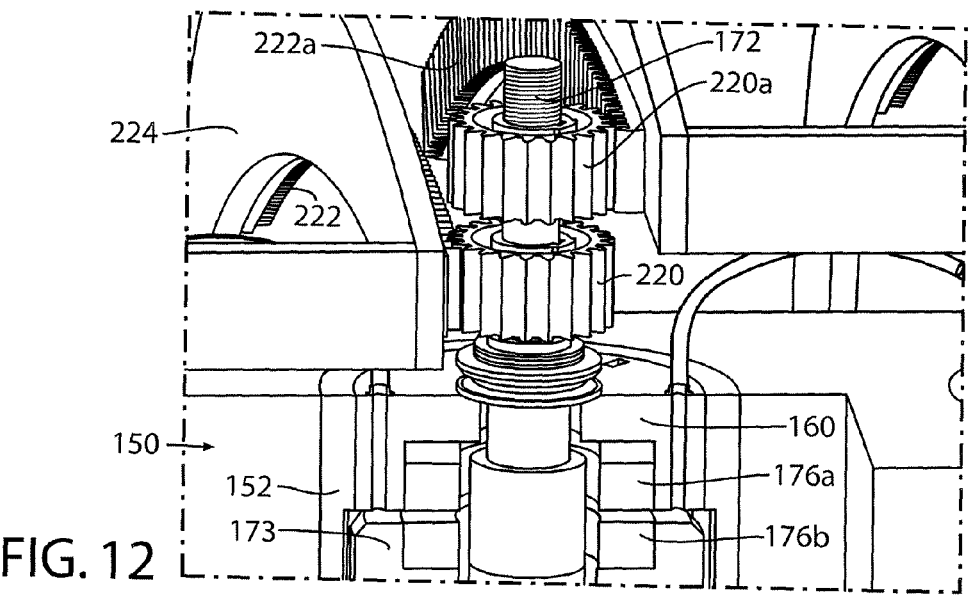
FIG. 12 illustrates an elevation view of the gear and rack arrangement for rotating linear electric generator of FIG. 9.
Figure 14:
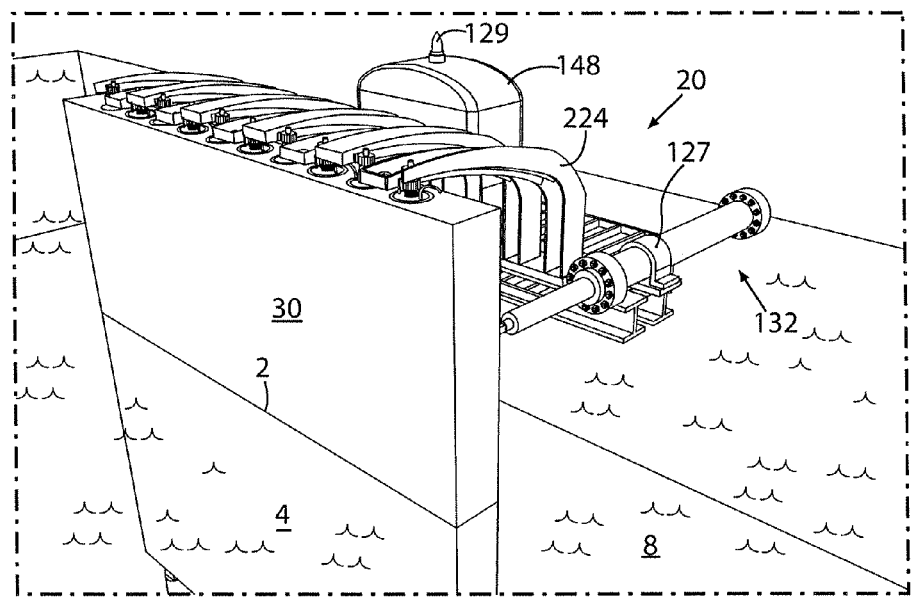
FIG. 14 illustrates another environmental view of employing linear electric generator of FIG. 9.
Figure 15:
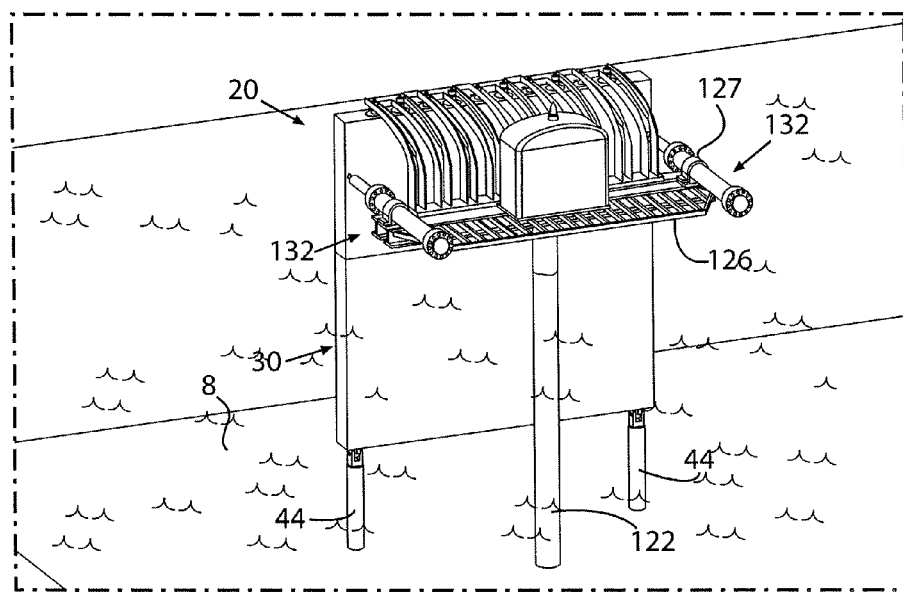
FIG. 15 illustrates yet another environmental view of employing linear electric generator of FIG. 9.

Now in a particular reference to FIGS. 9-11, the system 20, constructed in accordance with another embodiment of the invention, includes a predetermined plurality of electric generators, generally designated as 150. Each electric generator 150 includes an elongated hollow housing 152 having a round tubular cross-section in a plane transverse to its length. The top end of the housing 152 is closed by a first end member 160. The bottom end of the housing 152 is closed by a second end member 161. To attach each end member 160, 161 to respective end of the housing 152 there may be provided complimentary threads 162 or any other suitable means employed for closing open ends of the hollow tubular member. The threads 162 are sealed on the exterior of the electric generators 150 in a water tight manner, for example with a conventional gel material employed in marine application for sealing purposes. A rotor 154 is mounted within the hollow housing 152. Rotor 154 essentially comprises at least one stack of coil winding 154a, each having a doughnut like cross-section in a plane transverse to the length of the rotor 154. A stator 170 is also provided and is disposed within the inner chamber 158 formed by the peripheral inner surface 156 of the rotor 154 so that a magnetic flux air gap 155 is provided between the inner surface 156 of the rotor 154 and the outer peripheral surface of the stator 170. The stator 170 includes a shaft 172 and a predetermined plurality of annular magnets 174 mounted on the shaft 172 for rotation therewith. A pair of adjacent magnets 174 may be separated by a spacer 175. The shaft 172 is supported for rotation within the housing 152. Although, conventional marine type bearing arrangement can be employed in a robust watertight manner, the instant invention takes advantage of magnetic bearing arrangement, thus providing a substantially smooth effortless and friction free alternating circular motion of the stator 170 within the housing 152. More particularly, the shaft 172 includes a pair of annular collars 176, each secured to the peripheral surface of the shaft 172 for rotation therewith and a pair of bearings 176a and 176b mounted in tandem and forming a magnetic flux air gap 176c between opposed respective ends thereof. There is another magnetic air flux gap 176d that is formed between the inner peripheral surface of each bearing 176a, 176b and the outer peripheral surface of the collar 176. One bearing, shown as 176a is securely mounted, by way of an epoxy, within a cavity 166 provided within each end member 160, 161, while the other bearing 176b is securely mounted, for example by way of epoxy, within a bearing housing 173 stationary disposed within the housing 152 in spaced relationship with a respective end 160, 161 thereof.

The resulting effect of such bearings 176a, 176b and collar 176 is that the rotor 170 is rotated in a full 360-degree rotation manner and runs in a substantially stable and consistent manner. Thus, the stator shaft 172 rotates without creating friction. The cavity 166 housing the upper bearing 176a maintains substantially original shape through the life of the system 20 void any irregular or oval shapes associated with conventional motors. Furthermore, since the shaft 172 rotates without friction, less energy and/or momentum is required to start the rotation.

Full 360-degree rotation of the stator 170 ensures substantially evenly distributed force of attraction and aids in maintaining balance of the stator 170 during operation thus avoiding shuddering or instability generally associated with conventional rotors.

Furthermore, since resistance to friction is essentially eliminated, the electric generator 150 is characterized by a increased output.

Finally, since bearings 176a, 176b are friction-free as well as lubrication-free, they are advantageous to withstand temperature fluctuations associated with the body of water 2.

Such bearing arrangement is of a type as manufactured by any one of Mecos Traxler AG of Winterhur Switzerland magnetic bearing, SUNON of China and Magne-Motion, Inc of Devens, Mass. United States.

The bottom end of the shaft 172 is adapted with a bearing 170e securely mounted within the cavity 166f provided in the second end member 161. The bearing 176e is designed to withstand a number of full speed de-levitations.

To enhance reliability, the electric generator 150 has an uninterruptible power supply (UPS), which will provide the power necessary to support the shaft 172 during coast down condition. Furthermore, the upper end of the shaft 172 has an external thread 178 in order to fix the position, in the vertical longitudinal direction, of the stator assembly 170 with a first threaded nut fasteners 180. A sealing washer 182 is positioned between the threaded nut 180 and the first (upper) end member 160 for sealing purposes. There is also a second threaded nut fastener 184, having an internal watertight seal manufactured from a Nylon® material, that operatively engages the thread 178 and abuts the first threaded nut fasteners 180. Sealing washer 186, preferably manufactured from Teflon® material is also positioned between the threaded nut fasteners 180, 184.

The exposed top surface of the first end member 160 is adapted with a plurality of recesses 163 for ease of assembly and disassembly.

Now in further reference to FIGS. 8-111 and in a particular reference to FIGS. 12-15, each electric generator 150 is uniquely positioned within an elongated chamber 190 provided within the barrier 30 and disposed in a vertical direction when the barrier 30 is installed. The top end of the shaft 172 extends outwardly from the respective top edge surface of the barrier 30. Due to the above described mounting, it has been found necessary to remove heat generated by the electric generator 150 during operation. Accordingly, the present invention provides cooling means, generally designated as 200, that includes at least one passage 202 formed through the thickness of each of the upper end member 160 and the lower end member 161. The passages 202 are connected therebetween by at least one passage 203a which preferably has an annular shape entirely encasing the outer peripheral surface of the rotor 154 and at least one passage 203b in the bearing housing 173. The outer end of the passage 202 formed in the second (lower) end member 161 is generally closed with the valve 204, that has a pair of flaps 206 and 209. The inner flap 206 is biased in closed position by a spring 208. The outer flap 209 is biased in closed position by the air or water pressure. Both flaps 206 and 209 open due to air pressure introduced into the interior confines of the housing 152 through the passage 202 formed in the upper end member 160 and connected to supply of cooled air pressure. Such pressurized air supply is provided by a generally small two stage dry air with cool tube air compressor 145, a pump motor 147, air reservoir 140, and air cooler 140C, all preferably housed inside the climate control water tight enclosure 148 mounted on the base member 126. An air conduit 140D, air conduit check valve 140E and air distribution manifold 140F, located atop of barrier wall 30 and connected to air inlets 203 are provided for distributing the cooled air to the electric generators 150.

An optional low pressure air chamber 300 below the bottom end member 161 may be also provided for maintenance purposes. Such chamber 300 is formed by a flange 302 being spaced outwardly from the lower end member 161 and connected thereto with a rod 304, for example by way of a conventional threaded arrangement. A retainer flange 305 may be affixed on the surface of the rod 304 mediate ends thereof. A knob 306 is provided for holding the flange 302 on one end of the rod 304. A seal 308, such as an O-ring, is provided to seal the chamber 300. A plurality of air passages 202a are formed through the thickness of the flange 302 and are selectively opened or closed by valves 204. Second pressurized air chamber 310 may be also provided.

In order for the electric generator 150 to generate electric energy, there is means for enacting a rotational movement of the shaft 172. In accordance with a presently preferred embodiment of the invention, such rotational movement enacting means includes two (2) tooth sprockets (or gears) 220 and 220a, each mounted on the upper end of the shaft 172 for load rotation therewith in one direction and freewheeling in the opposed direction. While the sprocket 220 travels in one direction turning the generator shaft 172 to generate electric power with a full cycle load, sprocket 220a is free wheeling in the same direction with no load and while the barrier 30 pivots back to its original upright position, and now traveling in the opposite direction, pushed by the hydraulic cylinders 132 as sprocket 220a is now traveling in this opposite direction turning the generator shaft 172 to generate electric power with a full load, while sprocket 220 is now free wheeling in the same direction with no load. For example, the sprocket 220 or 220a may be of the type employed on conventional bicycles. The sprockets 220 and 220a are connected to a tandem toothed gear rack 222 and 222a that has a curvilinear shape having a radius substantially identical to the radius of the teeth of the pivoting sprocket 220 and 220A relative to its pivot axis at the pivot assembly 57. The toothed rack 222 and 222a are mounted on the drive arm housing 224 which is preferably secured to the base member 126.

The electric generator 150 is also electrically coupled to the collecting and converting station 144.

As the barrier 30 pivots back and forth in a reciprocal motion due to the energy from the tidal wave 5 and operation of the attenuators 132, the sprocket 220 travel reciprocally along the directional arm guide gear rack 222 causing the shaft 172 to turn and thus enabling the electric generator 150 to generate electric energy in both directions. The sprocket 220 then free wheels on the gear rack 222 when the barrier 30 pivots back to its original position, as the sprocket 220a traveling along the toothed rack 222a causes rotation of the shaft 172.

The sprockets 220, 220a are held on the upper end portion of the shaft 172 with nut fastener 221a and a washer 221b.

Figure 2:
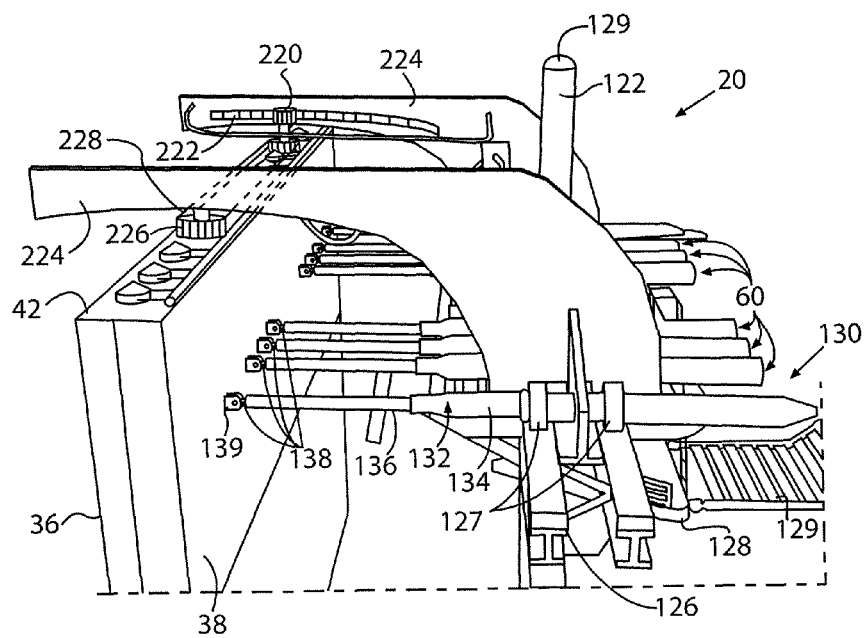
FIG. 2 illustrates a side isometric view of the system of FIG. 1.

Although the pair of sprockets 220 and 220a has been illustrated and described, use of a single sprocket 220 in combination with a single rack 222 is also contemplated as best shown in FIGS. 1-2. In further reference to FIGS. 1-2, at least one and a pair of arms 224 may be employed for directly driving electric generator 150 through the sprocket 220. The rotational motion to other electric generators may be transferred by sprockets 226 and tooth belt 228.

The present invention also contemplates termination of the inward pivoting of the barrier 30 by the bumper assemblies 240 having a mounting member 242 attached at one end to the elongated column 122. The other end of the mounting member 132 is provided with a pivot 134 having a bumper 136 attached thereto.

Now in further reference to FIG. 5, the system 20 may contain, as a redundancy for safety and reliability for both electric generators 60 and 150, a voltage collecting and conditioning circuit 270, consisting of a transformer 272, a full wave rectifier bridge 119, a super-capacitor electric power storage back device 276, and an harmonic/voltage conditioning circuit 278 providing an harmonically safe well balanced useful output voltage and current to an external electrical load, for grid integration, all housed inside of the climate control equipment enclosure 148.

Figures 16, 17:
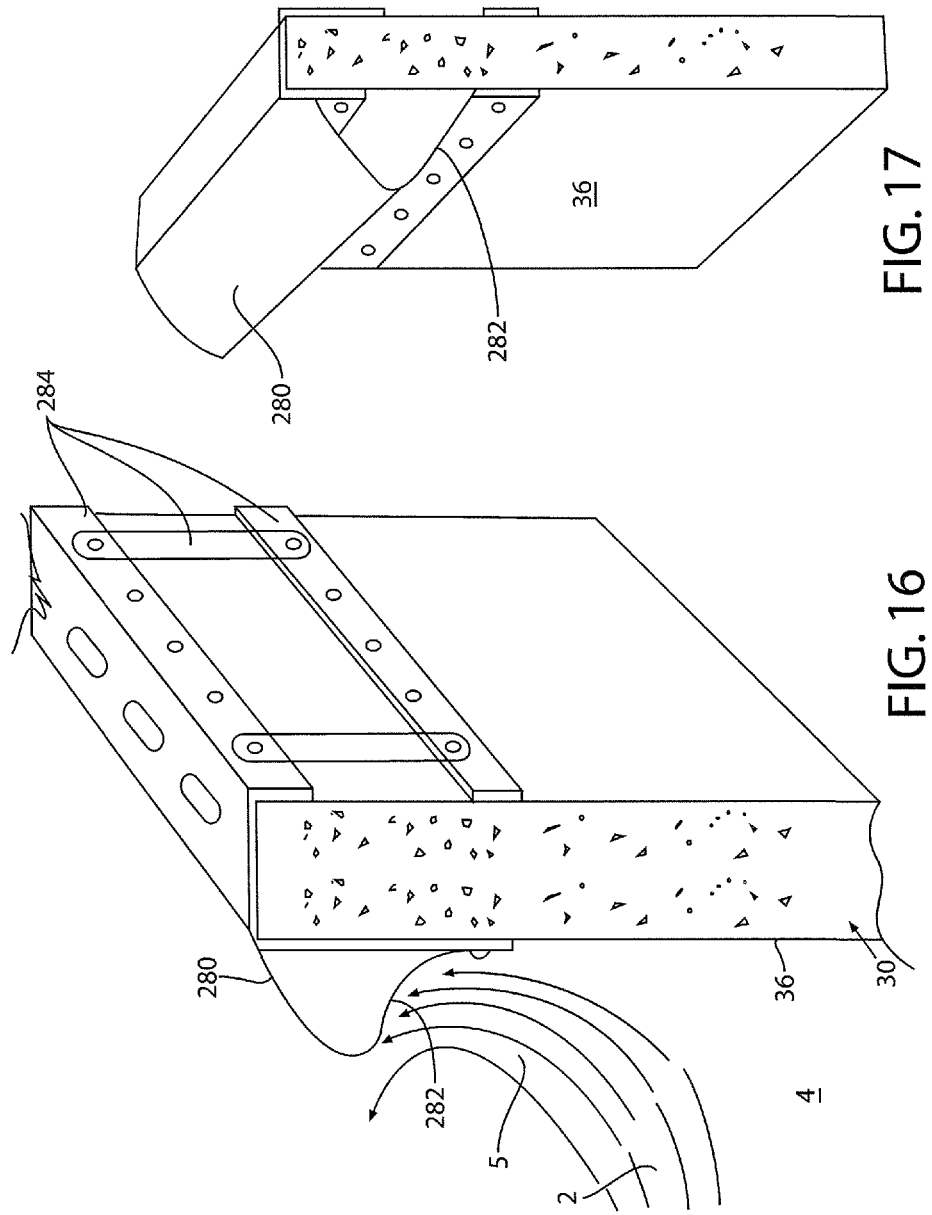
FIG. 16 illustrates a rear isometric view of a barrier employed within the system of for converting tidal wave energy into electric energy.
FIG. 17 illustrates a front isometric view of the barrier of FIG. 16.

Since the tidal wave 5 that strikes the outer surface 36 of the barrier 30 recoils generally upwardly before moving away from the barrier 30, the instant invention also contemplates that a baffle 280, best shown in FIGS. 16-17, may be attached to the outer surface 36 of the barrier 30 at top edge thereof in order to capture energy still contained by the recoiled wave 5 thus increasing the performance of the system 20. The baffle 280 contains a continuous surface 282 shaped and disposed as to receive the recoiled wave 5 in a generally transverse manner, as best shown in FIG. 16. Such baffle 280 may be manufactured from any material and preferably manufactured either from concrete or carbon fiber. Attachment of the baffle 280 to the barrier 30 depends on their respective materials. For example, a baffle 280 manufactured from concrete may be integrally casted as part of the barrier 30 also manufactured from concrete material. Braces or flanges 284 may be used for fastening baffle 280 to the barrier 30 manufactured from dissimilar materials.

In accordance with the most presently preferred embodiment of the invention, the system 20 includes both linear electric generators 60 and electric generators 150.

Figure 18:
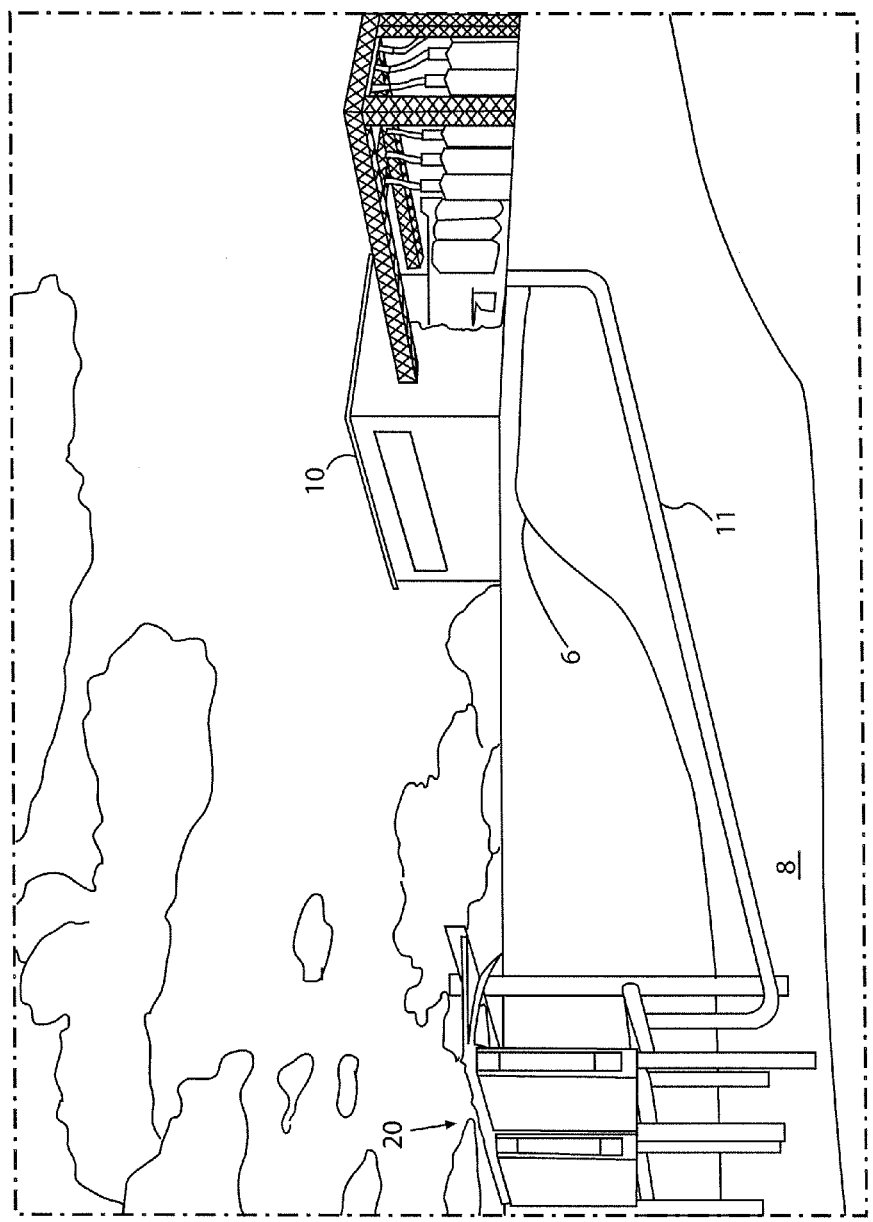
FIG. 18 illustrates an environmental view of employing an array of systems of FIG. 1.

As best shown in FIG. 18, the system 20 may include an array of barriers 30, linear electric generators 60 and linear electric generators 150 providing generated electric energy to a single collecting station 10.

Although the present invention has been shown in terms of generating electric energy, the invention described herein is also advantageous for preventing erosion of beachfront communities and coastal shoreline municipalities, refinery's, electric power generating stations and shipping ports, by attenuating strong periodic undulations in an expanse body of water can both stop and/or prevent erosion thus provide for generating energy from the motion of waves. In the process, it uses no chemicals or fuel and emits no fumes.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A system for converting marine surface wave energy into electric energy, said system comprising:
 (a) a barrier disposed generally vertically and having at least a portion thereof disposed above a surface of a body of water, said portion having a substantially planar surface disposed generally transverse to direction of marine surface waves;
 (b) means for pivotally connecting a bottom edge of said barrier to at least one of a floor bed, a rigid formation and a rigid structure; and
 (c) at least one linear electric generator coupled to a storage of electric energy and operable by a pivotal movement of said barrier.

2. The system, according to claim 1, wherein said means for pivotally connecting a bottom edge of said barrier includes at least one pylon at least partially disposed within said floor bed, at least one elongated member having one end thereof disposed on and secured to said bottom edge, and a pivot mechanism connecting an opposed end of said at least one elongated member to an exposed end of said at least one pylon.

3. The system, according to claim 1, wherein said at least one linear electric generator includes a stationary member and wherein said system includes means for securing said stationary member of said at least one linear electric generator above said surface in a substantially horizontal plane.

4. The system, according to claim 3, wherein said means securing said at least one linear electric generator includes at least one elongated column disposed vertically and having a bottom end thereof embedded within said floor bed, a base member secured in a substantially horizontal plane to said at least one elongated column, and wherein said at least one linear electric generator is supported on said base member.

5. The system, according to claim 1, wherein said at least one linear electric generator includes a movable member and wherein said system includes means for pivotally connecting a distal end of said moveable member of said at least one linear electric generator to an inner surface of said barrier.

6. The system, according to claim 1, wherein said system includes means for attenuating movement of said barrier in a direction away from said stationary member of said at least one linear electric generator.

7. The system, according to claim 6, wherein said means for attenuating movement of said barrier includes at least a pair of attenuators disposed in said substantially horizontal plane above said surface of said body of water, each of said least a pair of attenuators coupled to a source of operating energy.

8. The system, according to claim 7, wherein said system includes a controller.

9. The system, according to claim 8, wherein said system includes means for measuring parameters of said surface wave ahead of said barrier and communicating said measured parameters in a signal form to said controller.

10. A system for converting marine surface wave energy into electric energy, said system comprising:
 (a) a barrier disposed in a generally vertical position and having at least a portion thereof disposed above a surface of said body of water, said portion having a substantially planar surface disposed substantially transverse to direction of marine surface waves;
 (b) means for pivotally connecting a bottom edge of said barrier to at least one of a floor bed, rigid formation and a rigid structure;
 (c) at least one vertical chamber disposed within said barrier;
 (d) at least one electric generator positioned within said at least one vertical chamber and coupled to a storage of electric energy; and
 (e) means for enacting rotational movement of a stator disposed within said at least one electric generator during pivotal movement of said barrier.

11. The system, according to claim 10, wherein said system includes means for cooling said at least one vertical chamber.

12. The system, according to claim 11, wherein said cooling means includes a plurality of passages formed through said at least one electric generator and connected to a source of cooled air supply.

13. A system for converting marine surface wave energy into electric energy, said system comprising:
(a) a barrier disposed generally vertically and having at least a portion thereof disposed above a surface of said body of water, said portion having a substantially planar surface disposed substantially transverse to direction of marine surface waves;
(b) a predetermined plurality of spaced apart pylons at least partially disposed in a vertical direction within said floor bed and aligned in a first linear pattern substantially transverse to direction of marine surface waves;
(c) a predetermined plurality of elongated members, each of said predetermined plurality of elongated members having each of a hollow interior and one end thereof disposed on and secured to said bottom edge of said barrier;
(d) a hinge assembly pivotally connecting an opposed end of said each of said predetermined plurality of elongated members to an exposed end of a respective one of said predetermined plurality of first pylons;
(e) a predetermined plurality of elongated chambers disposed within said barrier, each of said predetermined plurality of elongated chambers having a longitudinal axis thereof aligned in vertical direction;
(f) a predetermined plurality of first electric generators, each of said predetermined plurality of first electric generators mounted within a respective elongated chamber and coupled to a storage of electric energy, said each of said predetermined plurality of first electric generators having a stator mounted for a rotational movement;
(g) means for imparting said rotational movement of said stator;
(h) a predetermined plurality of first air passages, each of said predetermined plurality of first air passages formed through a top end of a respective one of said predetermined plurality of first electric generators;
(i) a predetermined plurality of second air passages, each of said predetermined plurality of second air passages formed through a bottom end of said respective one of said predetermined plurality of first electric generators;
(j) a source of pressurized air supply, said source having at least an air pump;
(k) an air manifold connecting an output of said air pump with each of said predetermined plurality of first air passages;
(l) at least one column having a bottom end imbedded in said floor bed and having an opposed second end thereof positioned above said surface of said body of water;
(m) a base member secured in a substantially horizontal plane to said at least one column;
(n) a predetermined plurality of second electric generators supported above said surface of said body of water in said substantially horizontal plane on at least one of said at least one column and said base member;
(o) means for pivotally connecting a distal end of a movable portion of each of said predetermined plurality of second electric generators to an inner surface of said barrier;
(p) wherein each of said predetermined plurality of second electric generators disposed and coupled to said storage of electric energy;
(q) at least one stop mounted on a selected one of said predetermined plurality of columns;
(r) at least one powered attenuator having a stationary member thereof supported above said surface of said body of water in said substantially horizontal plane on said at least one of said at least one column and said base member and having a movable member thereof reciprocally movable in said substantially horizontal plane in a linear direction generally transverse to said inner surface of said barrier;
(s) means for pivotally connecting a distal end of said movable member of said at least one attenuator to said inner surface of said barrier; and
(t) a control means for controlling movement of said movable member of said at least one attenuator.

14. The system, according to claim 13, wherein said system includes a baffle mounted on said substantially planar surface of said barrier at or adjacent to a top edge thereof, said baffle having a continuous surface shaped and disposed to receive, in a generally transverse manner, said marine surface waves recoiling from said substantially planar surface of said barrier.

15. A system for converting marine surface wave energy into electric energy, said system comprising:
(a) a barrier disposed generally vertically and having at least a portion thereof disposed above a surface of said body of water, said portion having a substantially planar surface disposed substantially transverse to direction of marine surface waves;
(b) means for pivotally connecting a bottom edge of said barrier to at least one of a floor bed, a rigid formation and a rigid structure; and
(c) a baffle mounted on said substantially planar surface of said barrier at or adjacent to a top edge thereof, said baffle having a continuous surface shaped and disposed to receive, in a generally transverse manner, said marine surface waves recoiling from said substantially planar surface of said barrier.

* * * * *